Fig: 4
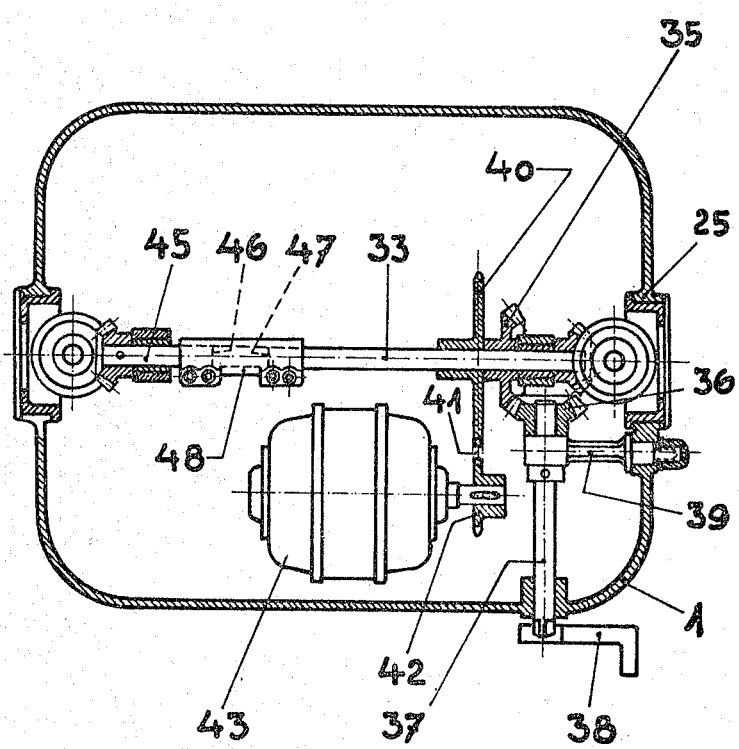

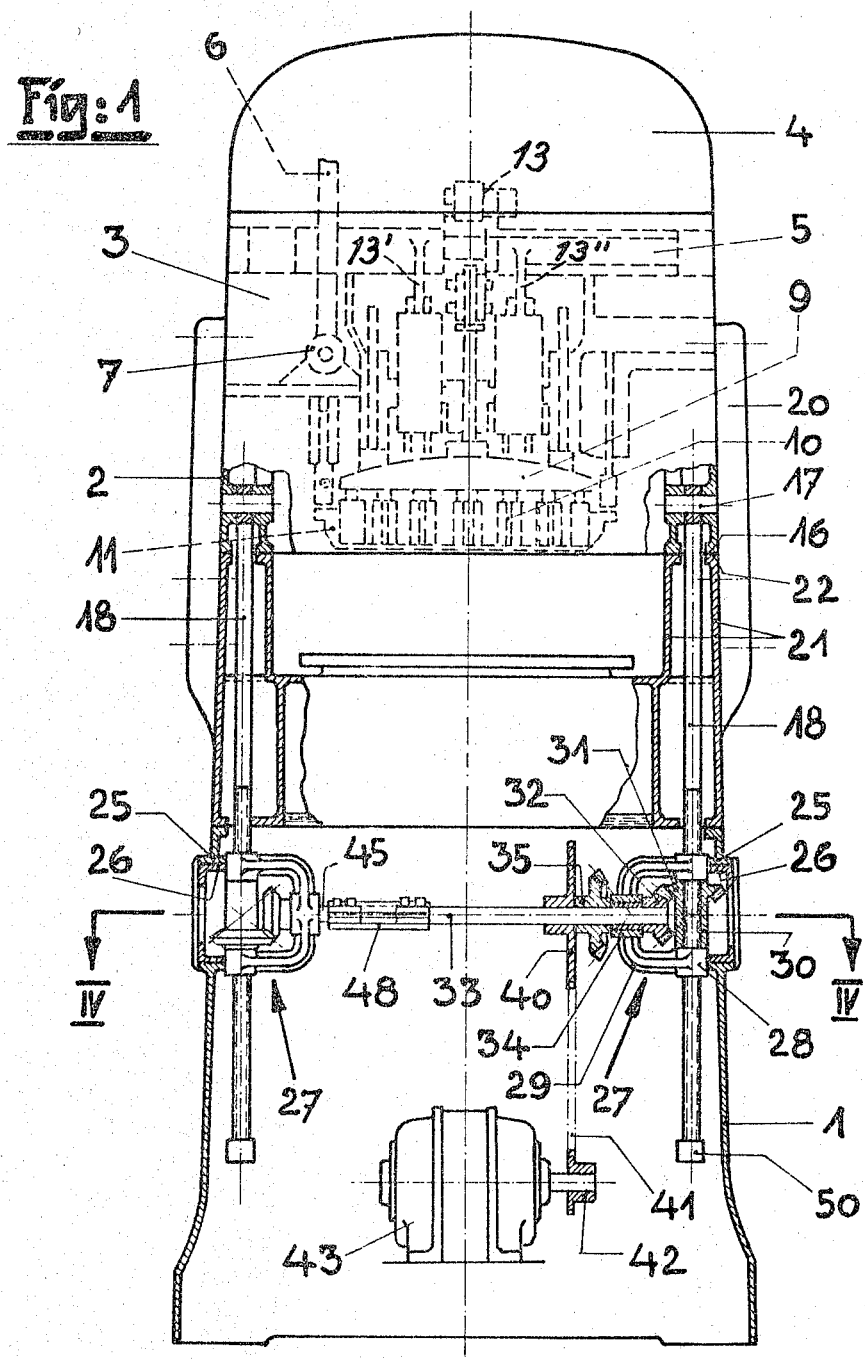

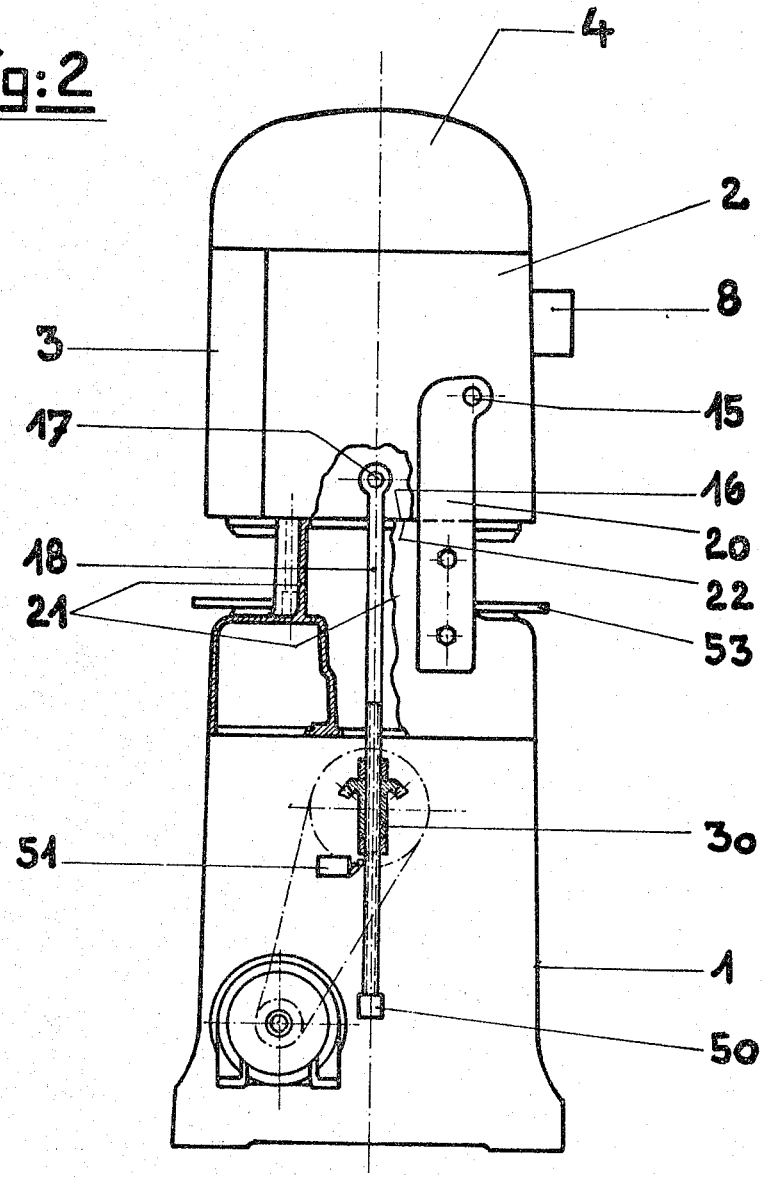

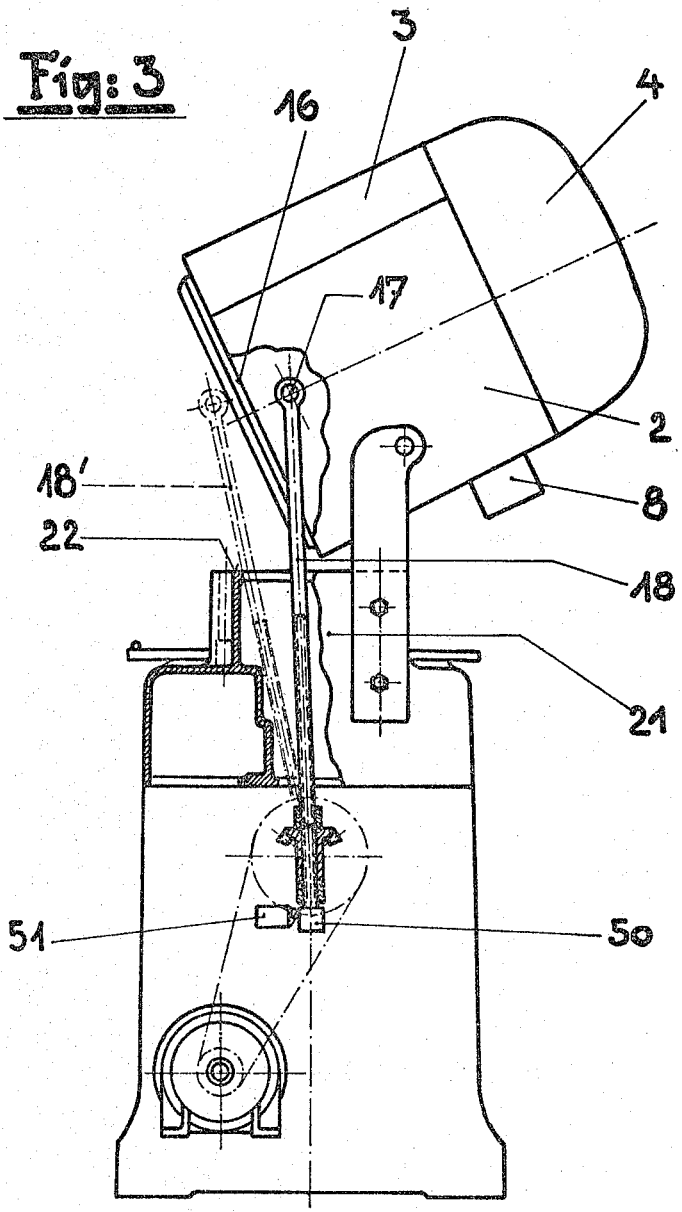

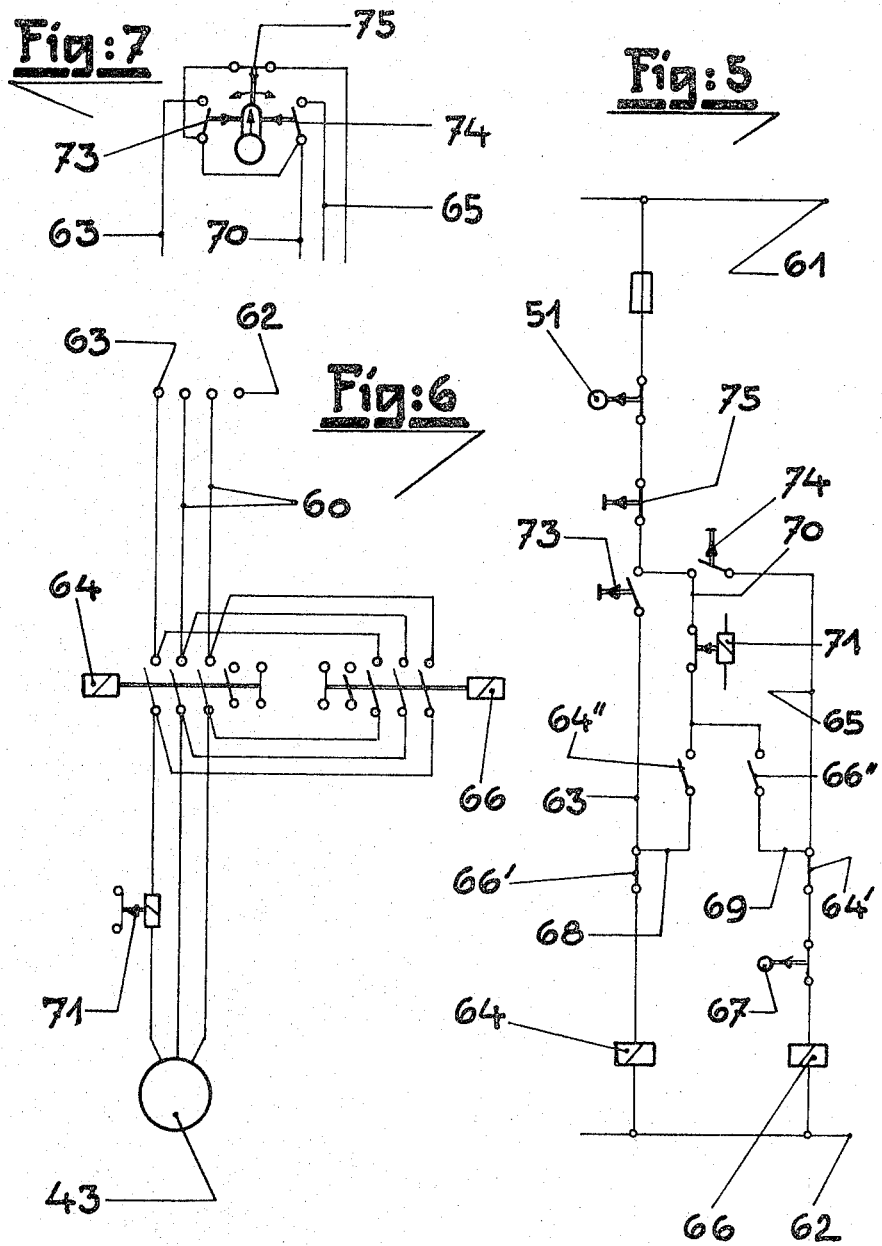

United States Patent Office 3,362,356
Patented Jan. 9, 1968

3,362,356
DOUGH BATCHING AND KNEADING
MACHINE
Herbert Schröder, Staffelstein, Upper Franconia, Germany
Filed May 20, 1965, Ser. No. 457,306
Claims priority, application Germany, May 23, 1964,
Sch 35,203
17 Claims. (Cl. 107—68)

ABSTRACT OF THE DISCLOSURE

A dough batching and kneading machine comprising a bracket or the like which is pivotable with respect to the machine frame about a fulcrum pin, this bracket receiving a press head, a cutter assembly and a so-called dough enveloping ring, and possessing a contact surface which when the bracket is closed may be drawn on to a support surface wrought on the machine frame, by means of at least one tension element, and an actuating device being adapted to move the tension element along its axis in order to open and close the bracket.

---

A known machine of this nature arranged in a machine frame includes a driving system which by means of appropriate linkages or the like drives the tools, press head, cutter assembly and dough enveloping ring situated in the bracket. To provide adequate access to the tools for cleaning purposes, the bracket may be pivoted by a lever acting as the tension element and linked with the bracket and the machine frame by a driving mechanism, through which lever the bracket may be raised or lowered by means of the driving mechanism, the contact surface resting on the support surface after the bracket has been lowered. This lever is arranged for its action to become effective laterally with respect to the center of the contact surface or support surface. This known device is employed for brackets of relatively low weight, or which are supported at their center of gravity, the driving device for the tools being situated in the machine frame. At least some of the driving rods extending from the machine frame to the bracket must be freed for the purpose. The said lever and its driving mechanism moreover require special safety devices to prevent the bracket from becoming detached from the machine frame owing to vibration during operation, and these safety devices must be adjustable. Owing to the externally situated driving elements for the tools, the known machine is not sufficiently accident-proof, and cannot be cleaned except with considerable exertion.

The present invention has the object of providing a device which is adapted to pivot a heavy bracket ballasted by driving devices, thus eliminating tool driving devices mounted in the machine frame, while at the same time assuring firm locking of the bracket fastening element to the machine frame by appropriate selection of the machine elements. The invention also has the object of providing a device for the purpose stated, which is simple and reliable in operation, and which is arranged in such manner that pivoting of the bracket need not be preceded by releasing some connections.

According to the invention, a tension rod or rods acting as a tension element or elements and mounted between the said bracket and the machine frame wherein the bracket has mounted in it a control shaft and drive system for the press head, cutter assembly and dough enveloping ring, is secured to one of the two parts at one extremity pivotally and with the other extremity swiveled on the other of the two parts by means of a nut rotatable on the rod and this nut being rotatable by means of an actuating mechanism. Preferably, the extremity of the rod projecting beyond the nut has an abutment which limits the motion of the rod in co-operation with a counter-abutment of the machine. It is immaterial in this arrangement whether the rod or nut is articulated in the bracket or in the machine frame. The rod and nut may moreover be endowed with self-locking screw threads.

A form of embodiment of the invention is described hereinafter in detail, by way of example but by no manner of means of limitation, with reference to the accompanying drawings, in which:

FIGURE 1 shows a frontal elevation of a machine according to the invention, which is partially sectioned, and tools being indicated by broken lines, FIGURE 2 shows a reduced scale lateral view, which is also partially sectioned, FIGURE 3 shows a view corresponding to FIGURE 2, but in a different position, FIGURE 4 shows an enlarged scale section taken through IV—IV of FIGURE 2, FIGURE 5 shows a wiring diagram for an electrical system, FIGURE 6 shows an enlarged scale detail of the diagram of FIGURE 5, and FIGURE 7 shows another detail of the wiring diagram of FIGURE 5.

As apparent from FIGURES 1 to 4, a dough batching and kneading machine comprises a machine frame 1 and a bracket 2 equipped with covering cowls 3 and 4. A control shaft 5 is mounted in the bracket 2 which is equipped with a worm gear 6 in engagement with a worm 7 which may be driven by a motor 8. A press head 9, a cutter assembly 10 and a dough eneveloping ring 11, are normally retracted within bracket 2 (FIG. 1) and driven by means of the control shaft 5 to lowered positions as hereinafter described. The press head 9, the cutter assembly 10 and the dough enveloping ring 11 in each case carry rods which run perpendicular to the press head and are guided on the bracket 2 so as to be movable to and fro in the direction of their longitudinal axes. Control devices 13, 13′, 13″, such as eccentrics or levers, are attached to the control shaft 5 and rotate therewith. These control devices 13, 13′, 13″ act on the press head 9, the cutter assembly 10 and the dough enveloping ring 11 or the rods and move them to and fro in the direction of the longitudinal axis of the rods. These control devices 13, 13′, 13″ are of known construction and operate in a known manner.

For one operation of the machine, a kneading plate 53 (see FIG. 2) covered with dough is situated beneath the press head 9, the cutter assembly 10 and the dough enveloping ring 11. The dough enveloping ring 11 is lowered onto the kneading plate 53, so that the dough enveloping ring envelopes the dough. The press head 9 is then pressed downwards against the dough. The cutter assembly 11 is pressed downwards through the dough against the kneading plate 53 and divides the dough on the kneading plate 53 into pieces. The kneading plate 53 then begins its kneading movements and rotates in a circle. For moving the kneading plate 53 known devices (not shown) are provided on the machine frame 1. Upon termination of the kneading movements, the knife assembly 10, the dough enveloping ring 11 and the press head 9 are again raised.

The bracket 2 has horizontally extending pivot pins 15 mounted thereon, as is apparent in FIGURE 2. These pins are situated above the horizontal projection planes which define bearing faces 16 on one extremity of the bracket. Above bearing faces 16 and centrally thereof there is mounted on each side of the bracket 2 a hinge pin 17 on which one extremity of each rod 18 is swingably mounted. Rods 18 cannot rotate about its own axis.

Securing arms 20 are removable from machine frame 1, being fastened by screws or the like, the pivot pins 15 being mounted in these arms. Supporting uprights 21 whose upper surfaces form support faces 22 for the bearing faces 16 are formed as an integral part of the machine. When the two faces of identical areas 16 and 22 are in contact, each rod 18 lies centrally with respect to these faces and is freely movable in such manner that the bracket 2 may be tipped according to FIGURE 3, and that after freeing the pin 17, the rod may be pivoted to its position 18′ for removal of the rod. One of the rods 18 may remain secured in order to hold the bracket 2 in its position.

Bearings 25 on each side of the frame 1, in which engage the pins 26 of casings 27 in each instance, are mounted in alignment with each other. The rods 18 are guided for longitudinal or axial displacement through eyes 28 in spiders 29 of the casing 27, and a nut 30 carrying a bevel gear 31 is mounted between the eyes 28 of one of said spiders in such manner that it may be rotated but not displaced longitudinally. This bevel gear 31 meshes with a driving bevel gear 32 of a spindle 33 which is rotatably mounted in an eye 34 of the spider 29. The spindle 33 carries a driving bevel gear 35 which, as shown in FIGURE 4, meshes with a manually driven bevel gear 36 which is keyed to a shaft 37 having a removable hand crank 38, the shaft 37 being rotatably mounted in the housing 1, and an arm 39. The spindle 33 is equipped with a chain sprocket 40 which is connected by a chain 41 with a motor chain sprocket 42 of a motor 43 mounted in the said frame 1. The other casing 27 which is situated at the other coaxial bearing 25 of the machine frame 1 has corresponding parts arranged in the same manner, with a shaft 45. The distance between the shaft extremities 46 and 47 of the shafts 45 and 33 is preferably at least as great as the depth of the bearing 25. The shafts 33 and 45 are joined together by means of a releasable and engageable coupling 48. The nut 30 is rotatable on the tension rod 18 and the nut 30 and rod 18 have self-locking screw threads of flat pitch or square threads.

The rod 18 carries a striker, stop, or the like 50, which may be adjustable and which co-operates with a switch 51 shown in FIGURE 2 in the manner indicated in FIGURE 3, when said bracket 2 is tipped rearwards. The switch 51 is situated preceding the eye 28 acting as an abutment.

The machine frame 1 encloses a device of known construction for the actuation of a kneading plate 53, which is not illustrated.

FIGURES 5 to 7 illustrate the wiring diagram for the motor 43 mounted in the frame. The motor and the following switching devices are connected to the conductors 60, 61 and 62. The wire 63 dependent on the conductor 62 has a contactor 64 for "lowering" the rod. A further wire 65 branching off from the conductor 63 has a contactor 66 for "raising" the rod. The two contactors 64 and 66 form a reversing switch. The conductor 65 is equipped with an end of travel switch 67 limiting the raising of the rod 18, then come switching elements 66′ and 64′ of the reversing contactors 64, 66. Switching elements 64″ and 66″ of the reversing contactors 64, 66 are disposed in branch wires 68 and 69 which lead to the conductor 70. The conductor 70 is associated with an overload relay 71 to protect the motor 43 against overload. The conductor 63 is also equipped with a "lowering" switch 73 and the conductor 65 with a "raising" switch 74. These two switches are subordinated to an emergency contact breaker 75. The switches 73, 74 are appropriately mounted on the machine frame 1.

The mode of operation is as follows: with the machine in the opened position according to FIGURE 3, one actuates the lowering switch 73 thereby causing the lowering contactor or relay 64 to operate, with its elements 64′ and 64″. The motor 43 is thus made to turn in such direction that by transmission through the motor chain sprocket 42, the chain 41 and the chain sprocket 40, the coupled shafts 33 and 45 are made to turn in such manner that by action through the bevel gears 32 and 31 and the nut 30 and corresponding nut of the other casing 27, the rods 18 are moved in the sense of lowering. The bracket 2 moved about the pivot pins 15 thus reaches the position according to FIGURE 2, the faces 16 and 22 coming into contact, relieving the pivot pins 15 of load. By further operation of the motor 43, the rods are stressed in such manner that the faces 16 and 22 bear on each other with forcible contact. The higher current demand caused thereby causes the operation of the overload relay 71 to interrupt the circuit of the motor 43. The machine may then be employed in production of batches of dough or the like, in conventional manner. In order to clean the tools 9, 10 and 11, the raising switch 74 is actuated, so as to cause operation of the raising relay 66 to turn the motor 43 in the opposite direction. In the manner hereinbefore specified, the nut 30 and corresponding nut of the other casing 27 are turned in the opposite direction, so that the rods 18 move upwards until the rod striker 50 operates the swtich 51 to interrupt the circuit of the motor 43. The machine is now in the position of FIGURE 3. The same action may be performed manually by means of the crank 38 and the parts 35, 36 and 37, independently of this electrical system.

To exchange the rods 18, the machine being in the position according to FIGURE 3, the hinge pin 17 is freed so that the rod may be swivelled into the position 18′ and removed after release of the rod striker 50. Due to the distance of the shaft extremities 46 and 47, either casing 27 may if required be withdrawn from the machine frame 1 after removal of the rod 18 or even without unscrewing the rod 18, after freeing the coupling 48. The coupling 48 makes it possible to set the alignment of the rods 18 in such manner as to prevent tilting during the pivoting of the bracket 2, so that the faces 16 and 22 are not tightened on each other with unequal force at the two sides.

Inasmuch as the securing arms 20 may be unscrewed, the bracket 2 and the machine frame 1 may be conveyed separately. To this end, the securing arms 20 are made hollow and the conductors provided for the electrical devices mounted in the bracket 2 are firmly secured in the securing arms, whereas corresponding electrical conductors arranged in the machine frame are separately secured. To this end, the hollow securing arm 20 may incorporate rows of terminals or plug sockets which are not shown, so that the extremities of the two sets of conductors may be separated when the bracket 2 is to be removed from the machine frame 1. The securing arm 20 may in the same way also be made to house the set of conductors for the frame 1. The sets of conductors may also lie loose in the securing arm.

The supporting uprights 21 are so made that their lateral surfaces lie flush with the lateral surfaces of the bracket 2 and of the machine frame 1, so that the machine as a whole is as free of projections as possible. The rods 18 thus lie within an appropriate protective housing.

As known per se, the pivot pins 15 are advantageously situated in the axis passing through the center of gravity of the bracket 2. The motor 8 also affects the position of this center of gravity.

The inventive principle may also be applied in a dough batching or other machine wherein the driving mechanisms are situated within the machine frame.

The invention is not to be limited to the form of embodiment described and illustrated solely by way of example, and modifications of detail and technically equivalent devices may be incorporated therein without thereby exceeding the scope of the present invention.

I claim:
1. A dough batching and kneading machine comprising a frame, a support face on said frame, a bracket pivotably mounted with respect to said frame, a press head, cutter assembly and dough enveloping ring, and presenting a contact face in said bracket so that when the bracket is closed the contact face may be drawn on to said support face on said frame, at least one threaded tension rod to draw said contact face against said support face, and an actuating device drivingly connected to said tension rod to drive it in either direction along its axis in order to open and close the bracket, a control shaft and drive system for said press head, cutter assembly and dough enveloping ring mounted in said bracket, said tension rod being pivoted to one of the two parts at one extremity, the other extremity being swiveled on the other of the two parts by means of said actuating device, said actuating device including a nut rotatable on the tension rod, and means including an actuating mechanism to rotate said nut, an extremity of the rod projecting beyond the nut having an abutment which limits the motion of the rod in cooperation with a counter-abutment of the machine.

2. A machine as defined in claim 1 in which the screw threads of said tension rod are of a flat pitch.

3. A machine as defined in claim 1 in which said actuating device comprises a rotatable shaft, a spider including a bearing to support said rotatable shaft, said nut being mounted in said spider to be held against movement axially of said nut, said bearing providing for pivoted movement of said spider about an axis normal to the axis of said nut, and means drivingly connecting said rotatable shaft to said nut to rotate said nut.

4. A machine according to claim 3 in which said nut has a bevel gear in engagement with a bevel gear on said rotatable shaft.

5. The machine of claim 4 in which there are two of said tension rods, said rotatable shaft being provided with two bevel gears, each said tension rod being provided with a nut mounted in a spider, and each said nut being provided with a bevel gear meshing with one of the said bevel gears on said rotatable shaft whereby said two tension rods are actuated in unison.

6. The machine of claim 5, in which said rotatable shaft is formed of two parts and a demountable connection is provided to secure said two parts in axial alignment whereby either of said spiders may be operatively disconnected from said rotatable shaft.

7. The machine of claim 6 in which a manually operable crank means extending outwardly of the machine is provided, and gear means is provided to connect said manually operable means to said rotatable shaft whereby said rotatable shaft may be rotated.

8. The machine according to claim 6 in which a chain sprocket is mounted on said rotatable shaft, a reversible electric motor is provided with a sprocket and a chain drivingly connects said two sprockets.

9. The machine according to claim 8 in which one of said tension rods is provided at its end with a stop, and an end-of-travel switch is provided in the circuit of the reversible motor, said switch being switchable by said stop on the tension rod.

10. The machine according to claim 9 in which the circuit of the reversible motor incorporates an overload relay which interrupts the circuit of said motor when the motor is overloaded by pulling a contact face of said bracket against a support face of the machine frame by means of said tension rods.

11. The machine according to claim 10 in which two securing arms are releasably fastened on the machine frame, and axially aligned horizontal pivot pins connect said bracket to said arms to act as fulcrum pins.

12. The machine of claim 11 in which one electric motor is provided to operate said press head, cutter assembly and dough enveloping ring in said bracket, and one electric motor is provided to operate said actuating device in the machine frame, and electric wires forming circuits for said motors, said arms being hollow and said wires being housed therein, and rows of terminals mounted in said hollow arms to which said wires are secured.

13. The machine according to claim 12 in which the pivot pins of said bracket are situated laterally outwardly of the projected area of said contact face, the bearings in the securing arms being such that the pivot pins are relieved of load when the contact face is tensioned against the support face.

14. A machine according to claim 13 in which each tension rod is separately articulated in releasable manner to said bracket at one extremity, the spiders incorporating said nuts being releasably mounted on the machine frame, and the distance separating the coupled extremities of the shafts of said bevel gears corresponding to the length of the bearing locating the pivot pin of said casing.

15. The machine of claim 14 which at least one supporting upright is provided, the lower portion of one of said tension rods extending downwardly through said supporting upright, the upper end of said supporting upright forming a support face, and in which the stop on said tension rod is removable whereby upon removal of said stop said tension rod may be unscrewed from said nut and withdrawn from said machine.

16. The machine according to claim 15 in which said support face of said supporting upright is in alignment with a corresponding lateral surface of the machine frame, and a surface delimiting said bracket is in alignment with the support surface of said supporting upright.

17. A machine according to claim 16 in which in the clamped condition of said bracket said tension rods extend centrally with respect to said contact and support faces.

References Cited
UNITED STATES PATENTS 1,859,762   5/1932   Blum _____ 107—68
1,892,251   12/1932  Rausch _____ 107—68

WALTER A. SCHEEL, *Primary Examiner.*

JOSEPH SHEA, *Assistant Examiner.*